United States Patent [19]
Ingwall et al.

[11] Patent Number: 5,198,912
[45] Date of Patent: Mar. 30, 1993

[54] VOLUME PHASE HOLOGRAM WITH LIQUID CRYSTAL IN MICROVOIDS BETWEEN FRINGES

[75] Inventors: Richard T. Ingwall, Newton; Mark A. Troll, Somerville; Duncan H. Whitney, Beverly, all of Mass.

[73] Assignee: Polaroid Corporation, Cambridge, Mass.

[21] Appl. No.: 729,777

[22] Filed: Jul. 10, 1991

Related U.S. Application Data

[63] Continuation of Ser. No. 464,427, Jan. 12, 1990, abandoned.

[51] Int. Cl.$^5$ .......................... G02B 5/32; G02F 1/13; G03H 1/02
[52] U.S. Cl. .......................................... 359/3; 359/7; 359/52; 359/94; 430/1
[58] Field of Search ........... 350/162.2, 162.22, 162.24, 350/452, 348, 3.61, 3.64, 347 R, 347 V, 347 E; 359/3, 7, 51, 52, 93, 94; 430/1, 2

[56] References Cited

U.S. PATENT DOCUMENTS

| | | | |
|---|---|---|---|
| 4,251,137 | 2/1981 | Knop et al. | 350/348 |
| 4,535,041 | 8/1985 | Fielding et al. | 430/1 |
| 4,588,664 | 5/1986 | Fielding et al. | 430/1 |
| 4,729,640 | 3/1988 | Sakata | 350/162.22 |
| 4,729,641 | 3/1988 | Matsuoka et al. | 350/348 |
| 4,822,146 | 4/1989 | Yamanobe et al. | 350/348 |
| 4,850,681 | 7/1989 | Yamanobe et al. | 350/348 |
| 4,850,682 | 7/1989 | Gerritsen | 350/162.2 |
| 4,856,869 | 8/1989 | Sakata et al. | 350/162.24 |
| 4,904,063 | 2/1990 | Okada et al. | 350/452 |
| 4,970,129 | 11/1990 | Ingwall et al. | 430/1 |

FOREIGN PATENT DOCUMENTS

| | | | |
|---|---|---|---|
| 62-194221 | 8/1987 | Japan | 350/348 |
| 63-262602 | 10/1988 | Japan | 350/348 |
| 1-17028 | 1/1989 | Japan | 350/162.2 |
| WO8804796 | 6/1988 | PCT Int'l Appl. | |

OTHER PUBLICATIONS

Caulfield, *Handbook of Optical Holography*, Chapter 3, "Classification of Holograms," New York, 1979, pp. 127 to 129.

Craighead et al., "New Display Based on Electrically Induced Index Matching In An Inhomogeneous Medium", Appl. Phys. Lett., vol. 40, No. 1, pp. 22–24 (Jan. 1, 1982).

Bao-Gang Wu et al, "Angular Discrimination of Light Transmission Through Polymer-Dispersed Liquid–Crystal Films", J. Appl. Phys., vol. 62, No. 1, pp. 3925–3931 (Nov. 1, 1987).

Sainov et al., "Holographic Diffraction Grating Controlled By Means of Nematic Liquid Crystal", Mol. Cryst. Liq. Cryst., vol. 152, pp. 609–615 (1987).

Ingwall et al., "Mechanism of Hologram Formation in DMP-128 Photopolymer", Optical Engineering, vol. 28, No. 6, pp. 586–591 (Jun. 1989).

*Primary Examiner*—Bruce Y. Arnold
*Assistant Examiner*—Martin Lerner
*Attorney, Agent, or Firm*—Stanley H. Mervis

[57] ABSTRACT

Composite holograms are disclosed wherein microvoids between the holographic interference fringes are filled with a liquid crystal. The diffraction efficiency and other holographic properties of such composite holograms may be varied by external stimuli, e.g., application of an electric field of thermal energy.

20 Claims, 1 Drawing Sheet

VOLUME PHASE HOLOGRAM WITH LIQUID CRYSTAL IN MICROVOIDS BETWEEN FRINGES

This application is a continuation of copending application Ser. No. 464,427 filed Jan. 12, 1990, now abandoned.

This invention is concerned with composite volume phase holograms and other holographic optical elements, and more particularly with the provision of holographic elements having a discontinuous distribution of a separate phase containing a liquid crystal. These novel composite holographic optical elements exhibit different diffraction efficiency as a function of external stimuli, such as an applied electric field.

BACKGROUND OF THE INVENTION

The copending U.S. application of Richard T. Ingwall and Mark A. Troll, Ser. No. 175,208 filed Mar. 30, 1988 (corresponding to PCT Published Application WO 88/04796 published Jun. 30, 1988) now U.S. Pat. No. 4,970,129 issued Nov. 13, 1990, discloses and claims volume phase holograms characterized by the fact that microvoids between the fringes of the recorded interference pattern are at least partially filled with a material having an index of refraction different from that of the matrix. These void-filled holograms may be referred to as composite holograms. The material filling the microvoids changes the properties of the holographic element, e.g., it may provide enhanced stability, or it may modify the optical properties by changing the average refractive index. The nature and properties of such composite holograms have been described by R. T. Ingwall and M. A. Troll in "Mechanism of Hologram Formation in DMP-128 Photopolymer", Optical Engineering, Vol. 28, No. 6, pp. 586–591 (June 1989).

It is known to form a polymer film having a liquid crystal dispersed therein; see, for example, H. G. Craighead et al, "New Display Based On Electrically Induced Index Matching In An Inhomogeneous Medium", Appl. Phys. Lett., Vol. 40, No. 1, pp. 22–24 (1 Jan. 1982), and Bao-Gang Wu et al, "Angular Discrimination of Light Transmission Through Polymer-Dispersed Liquid-Crystal Films", J. Appl. Phys., Vol. 62, No. 1, pp. 3925–3931 (1 Nov. 1987). Such polymer-dispersed liquid crystal films may be prepared, e.g., by polymerization-induced phase separation or by thermally-induced phase separation. In either process, a homogeneous solution containing the liquid crystal and the polymer or polymer precursor is converted into a film or polymer matrix having liquid crystal droplets homogeneously dispersed therein. The utility of such films is based upon light scattering.

It also has been proposed to modulate a hologram by providing a liquid crystal in the surface grooves of a holographic diffraction grating. See Simeon Sainov et al, "Halographic Diffraction Grating Controlled by Means of Nematic Liquid Crystal", Mol. Cryst. Liq. Cryst., Vol. 152, pp. 609–615 (1987).

SUMMARY OF THE INVENTION

In accordance with the present invention, holographic optical elements are provided having a discontinuous, non-scattering distribution of a separate liquid crystal phase between the fringes. Such holographic optical elements exhibit changes in diffraction efficiency as a function of changes in the orientation of the liquid crystal by application of an electric field. These holographic optical elements therefore have the ability of acting as switchable holographic optical elements.

BRIEF DESCRIPTION OF DRAWING

This invention may be further understood by reference to the drawing, wherein.

DETAILED DESCRIPTION OF THE INVENTION

Volume phase holograms or holographic optical elements record information as a modulation of the refractive index of the medium in which the holographic recording is effected. Thus, the polymerization of a monomer present in a photopolymerizable film records the laser holographic exposure as a pattern of "fringes" or "strata" of polymer. The fringes are relatively perpendicular to the support in a volume phase transmission hologram, and relatively parallel to the support in a volume phase reflection hologram. The polymer comprising the fringes has a different index of refraction than the material between the fringes, and the resulting modulation of light as a function of the index differences permits reconstruction of the hologram.

As disclosed and claimed in the above mentioned copending U.S. application Ser. No. 175,208, it is possible to form volume phase holograms wherein microvoids are present between the fringes (such microvoids amplify the index modulation from that which would be obtained in their absence), and to modify the optical or other properties of the hologram by replacing air in the microvoids with a different material. In accordance with this invention, such microvoids are at least partially filled with a liquid crystal. The orientation of the liquid crystal within the microvoid may be changed by the application of an electric field. Liquid crystals are characterized by having one index of refraction along the long axis and a different index along the short axis. The change in refractive index upon reorientation is a function of the birefringence of the liquid crystal. By selecting a liquid crystal which has one of its indices of refraction substantially matching the index of refraction of the medium, it is possible to substantially reduce the diffraction efficiency of the hologram, even to the point of substantially eliminating the hologram, when the liquid crystal is so oriented. Orientation in the opposite manner by application of an electric field provides a different index of refraction compared with that of the medium, thus providing an index difference. The resulting hologram therefore may be "switched" between the two diffraction efficiency conditions.

For convenience, the disclosure of the above mentioned Ingwall and Troll U.S. patent application Ser. No. 175,208, and the disclosure of the above mentioned Ingwall and Troll Optical Engineering article, are incorporated herein by reference.

Figure 1:
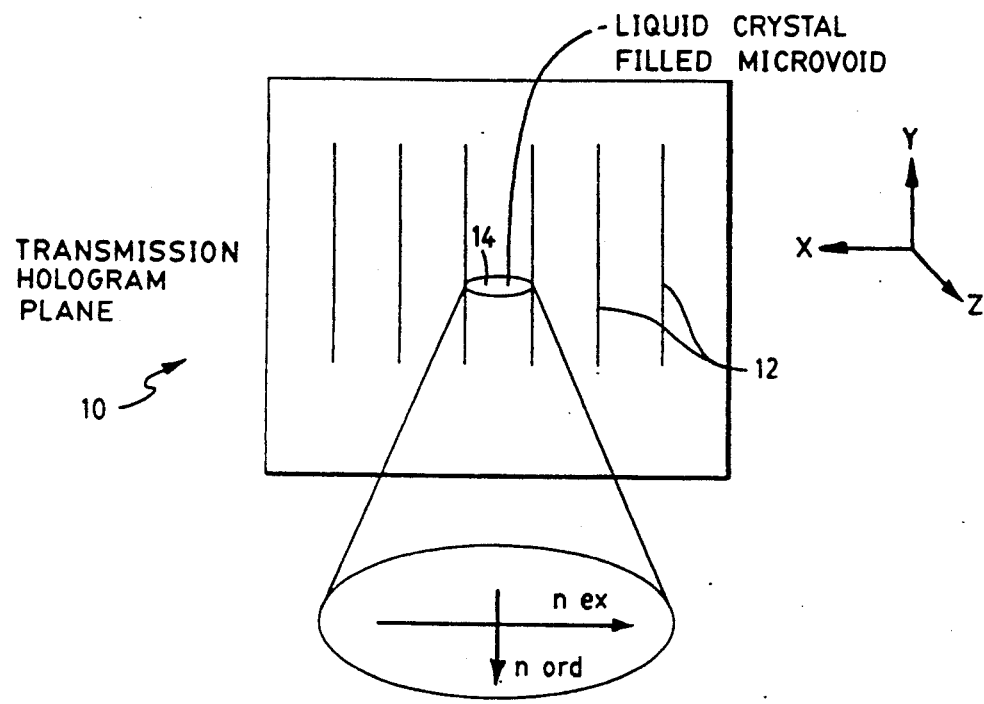
FIG. 1 illustrates a transmission hologram viewed edgewise with a liquid crystal oriented in microvoids between the fringes with the long axis perpendicular to the fringes.

More specifically, FIG. 1 shows a transmission hologram 10, viewed in the plane of the hologram, with the fringes 12 perpendicular to the plane of the hologram. For ease of understanding, only a single liquid crystal filled microvoid 14 is shown between the fringes 12, with the microvoid, shown for illustration as generally ellipsoid in shape, also enlarged to more clearly illustrate the long axis extraordinary index ("n ex") and the short axis ordinary index ("n ord"). The x, y and z directions also are indicated.

Figure 2:
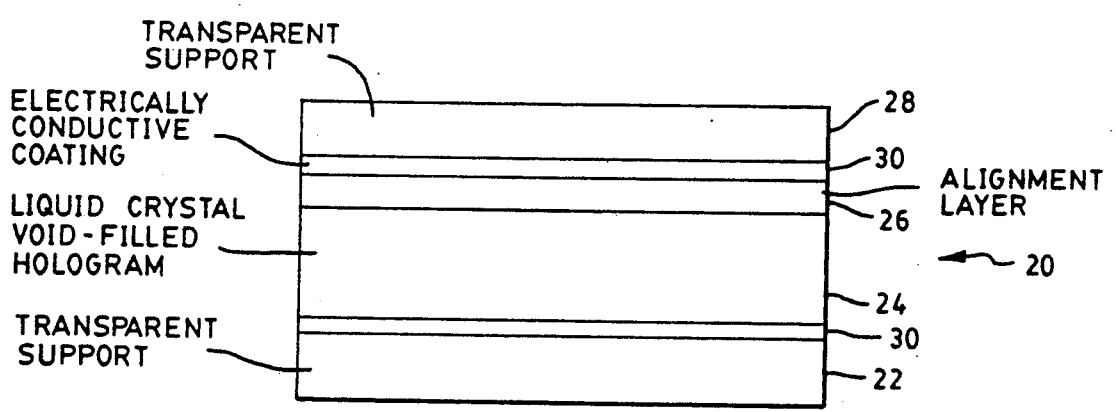
FIG. 2 illustrates a switchable cell containing a liquid crystal filled holographic composite layer.

FIG. 2 illustrates a switchable cell 20 incorporating a liquid crystal void-filled hologram 24 (similar to hologram 12 of FIG. 1). The hologram 24 is carried on an electrically conductive coating 30, e.g., of indium tin oxide (ITO) on the inner surface of a transparent, e.g., glass, support 22. A second transparent support 28, carrying a conductive coating 30 on its inner surface, also carries an alignment layer 26 in contact with the surface of the hologram 24. Means, not shown, are provided to supply electrical voltage to form an electric field to change the alignment of the liquid crystal.

When the hologram is filled with the liquid crystal, a thin layer of liquid crystal may remain on the surface. The alignment layer 26 is provided to align surface liquid crystals, thereby preventing light scatter. In the preferred embodiments discussed below, it has been found that such an alignment layer does not influence or control the alignment of the liquid crystal in the microvoids.

In the preferred embodiments of this invention, the holographic optical element is formed in a photopolymerizable composition comprising a dye sensitizer such as methylene blue, a branched polyethylenimine as a polymerization initiator, and a free radical polymerizable ethylenic unsaturated monomer, e.g., an acrylic monomer, and lithium acrylate. Such photopolymerizable elements are described and claimed in U.S. Pat. No. 4,588,664 issued May 13, 1986 to Herbert L. Fielding and Richard T. Ingwall. As disclosed in the cited Ingwall and Troll application and article, the microvoids are formed during the post-exposure processing. Incorporation of the liquid crystal into the microvoids is effected by heating the liquid crystal above its clearing temperature, and drawing the liquid crystal by capillary action into the microvoids. The filling of the microvoids is generally observed by a decrease in the brightness of the hologram. Liquid crystal switching is observed as a change in the diffraction efficiency of the liquid crystal filled hologram as a function of the birefringence of the liquid crystal and of field-induced molecular reorientation. Liquid crystal orientation is confirmed by the observation of different diffraction efficiencies depending upon the polarization of the read-beam used to measure diffraction efficiency.

It has further and surprisingly been found that liquid crystals will self-align in a particular direction when incorporated into a hologram of the above type, and that the direction of such self-alignment also may be changed by a simple pre-treatment of the microvoid surface prior to incorporating the liquid crystal. Thus, it has been found that an untreated transmission hologram spontaneously induced a planar alignment of a nematic liquid crystal with its long axis directed along the x-direction, i.e., perpendicular to the fringes, as illustrated in FIG. 1. When such a transmission hologram was treated, e.g., with stearic acid, prior to void filling, the spontaneous alignment was homeotropic, parallel to both the fringe planes and along the z-direction (film thickness). Reflection holograms not pre-treated with stearic acid exhibit spontaneous ordering of the liquid crystal such that the long axis is parallel in the xy-plane, whereas stearic acid treated reflection holograms spontaneously induced a homeotropic alignment of the liquid crystal.

The following examples are given for the purposes of illustration and are not to be considered as limiting the invention.

EXAMPLE 1

A series of holograms were prepared by coating a lithium acrylate/acrylic acid/polyethylenimine photopolymer film of the type described in Example 7 of the above-mentioned U.S. Pat. No. 4,588,664 on ITO-coated glass. Following humidification to activate the film, holographic laser exposure, a flood exposure, and processing (as described in detail below), each hologram was filled with nematic liquid crystal RO-TN-570 (commercially available from Hoffman-LaRoche, and equivalent to liquid crystal E7 commercially available from E. Merck). Void filling with the liquid crystal was effected by heating the liquid crystal to about 80° C. (i.e., above its clearing temperature) allowing the heated liquid crystal to imbibe into and fill the voids by capillary action, and then cooling the filled hologram. If necessary, excess liquid crystal was wiped off while still hot.

The average index of refraction of the polymeric matrix of the unfilled hologram is about 1.56. The ordinary index of RO-TN-570 liquid crystal is about 1.52, almost matching that of the unfilled hologram. As the liquid crystal fills the voids, the hologram appears to clear due to the reduced index difference. Cooling the filled hologram allows spontaneous orientation of the liquid crystal with a resulting increase in index modulation due to the higher extraordinary index of the liquid crystal (about 1.74 for RO-TN-570) and the hologram appeared much brighter.

The polarization dependent index of refraction of the liquid crystal filled hologram in the x, y and z planes, as measured using a Metricon PC 2000 Prism Coupler equipped with a He:Ne (6328 Angstrom) laser are shown below. With the laser beam polarized vertically (in the y direction shown in FIG. 1), the ordinary refractive index of the liquid crystal is addressed to the extent the liquid crystal is aligned, whereas when the laser beam is polarized horizontally the extraordinary index is addressed. The measured indices were:

| Hologram | n(x) | n(y) | n(z) |
|---|---|---|---|
| 1 | 1.607 | 1.586 | 1.544 |
| 2 | 1.579 | 1.561 | 1.547 |
| 3 | 1.548 | 1.548 | 1.576 |
| 4 | 1.572 | 1.571 | 1.539 |
| 5 | 1.562 | 1.562 | 1.532 |
| 6 | 1.546 | 1.546 | 1.579 |
| 7 | 1.543 | 1.541 | 1.571 |

Holograms 1-7 (prior to void filling with the liquid crystal) were prepared as follows:

Holooram 1 (transmission): The photopolymer layer had a thickness of 2 microns, the photosensitizer was sodium riboflavin-5-phosphate, and the plate was humidified for 7 minutes to activate it. Holographic exposure (5 seconds, 10 mJ/cm$^2$ was effected at an angle of 13° using an Argon laser (488 nm), the exposed plate dipped in a solution of 90 cc. methanol, 10 cc. acetic acid and 4 cc. water for 2 minutes, followed by a 2 minute dip in a solution of zirconium acetate (10%), acetic acid (4%), methanol (66%) and water (20%).

Hologram 2 (transmission): This hologram was prepared as above described for Hologram 1, except that the thickness was 5 microns and the exposure angle was 10°.

Hologram 3 (transmission): This hologram was prepared as described above for Hologram 2, except that the zirconium acetate-treated hologram was rinsed with isopropyl alcohol, and then soaked in a 5% solution of stearic acid in xylene for 5 minutes. The hologram was then rinsed in isopropanol and dried prior to void filling.

Hologram 4 (reflection): The photopolymer layer was 15 microns thick, and the photosensitizer was methylene blue. Holographic reflection exposure was effected with a Krypton laser (647 nm). Processing was as described for Hologram 1.

Holooram 5 (reflection): This hologram was prepared as described for Hologram 4 except the photopolymer layer was 10 microns thick, the photosensitizer was sodium-5-phosphate and exposure was to an Argon laser (488 nm).

Hologram 6 (reflection): This hologram was prepared as described for Hologram 5 except that the photopolymer thickness was 7 microns, and the zirconium acetate-treated hologram was soaked in stearic acid as described for Hologram 3.

Hologram 7 (reflection): This hologram was prepared as described for Hologram 6 except that the photopolymer thickness was 15 microns, and exposure was to a Krypton laser (647 nm).

Analysis of the measured indices of refraction showed that the assigned spontaneous orientaion of the imbibed liquid crystal, and the different spontaneous orientation as a result of the stearic acid treatment, were appropriate.

The diffraction efficiencies (DE) of the above holograms (gratings) were measured and found to be:

| Transmission Hologram | $DE_{s\text{-}pol}$ | $DE_{p\text{-}pol}$ |
|---|---|---|
| 1 | 29% | 64% |
| 2 | 0.7% | 44% |
| 3 | 0.5% | 0.2% |

($DE_{s\text{-}pol}$ is the diffraction efficiency measured using light polarized parallel to the direction of the fringes, and $DE_{p\text{-}pol}$ is the diffraction efficiency measured using light polarized perpendicular to the direction of the fringes.

| Reflection Hologram | DE |
|---|---|
| 4 | 78% |
| 5 | N/A |
| 6 | 0% |
| 7 | 29% |

EXAMPLE 2

Switchable liquid crystal cells of the type shown in FIG. 2 were prepared by coupling an alignment layer with an E7 liquid crystal filled transmission hologram. The alignment layer was prepared by spin coating (1 minute at 4000 rpm) ITO-coated glass plate with a 1% solution of Nylon 6 in trichloroethylene. The coated plate was heated at 100° C. for 1 hour, cooled, and then buffed 10 times in one direction on lint-free cloth to make an alignment layer. The diffraction efficiency of the hologram to p polarized light (parallel to incident axis) could be increased or decreased as a function of the applied voltage.

While the above examples have employed holograms made using the photopolymerizable composition of U.S. Pat. No. 4,588,664, it will be understood that the invention is not so limited, and one may use any holographic element having microvoids between the fringes. Selection of liquid crystals suitable for use in this invention may be effected by routine screening tests, taking into consideration the relationship of the indices of refraction of the liquid crystal and of the unfilled hologram.

The treatment of holograms with a fatty acid, such as stearic acid, is disclosed in U.S. Pat. No. 4,535,041 issued to Herbert L. Fielding and Richard T. Ingwall on Aug. 13, 1985.

In addition to the use of an electrical field to vary the liquid crystal alignment, such variations may also be obtained by other known methods, e.g., application of thermal energy or a high intensity light beam.

What is claimed is:

1. A volume phase holographic element, in which information is recorded as a pattern of fringes of a material having a different index of refraction than the material between the fringes, characterized in that microvoids between said fringes are at least partially filled with a liquid crystal.

2. A volume phase holographic element as defined in claim 1, wherein said element is a transmission hologram.

3. A volume phase holographic element as defined in claim 1, wherein said element is a reflection hologram.

4. A volume phase holographic element as defined in claim 1, wherein said liquid crystal is a nematic liquid crystal.

5. A volume phase holographic element as defined in claim 4, wherein said element is a transmission hologram and said nematic liquid crystal is oriented with its long axis perpendicular to said fringes.

6. A volume phase holographic element as defined in claim 1 wherein said element comprises branched polyethylenimine and a polymerized ethylenic monomer.

7. A switchable cell comprising, in sequence, (a) a first transparent support carrying an electrically conductive coating, (b) a volume phase holographic element, in which information is recorded as a pattern of fringes of a material having a different index of refraction than the material between the fringes, wherein microvoids between fringes are at least partially filled with a liquid crystal, and (c) a second transparent support carrying an electrically conductive coating, and means to supply an electric current to said electrically conductive coatings.

8. A switchable cell as defined in claim 7, wherein said liquid crystal is a nematic liquid crystal.

9. A switchable cell as defined in claim 7, wherein said volume phase holographic element is a transmission hologram.

10. A switchable cell as defined in claim 7 wherein said volume phase holographic element is a reflection hologram.

11. A switchable cell as defined in claim 7 wherein said volume phase holographic element comprises branched polyethylenimine and a polymerized ethylenic monomer.

12. A switchable cell as defined in claim 7, including an alignment layer positioned between said volume phase holographic element and said second transparent support.

13. A method of forming a composite volume phase holographic element, said method comprising:
    (a) holographically exposing a photosensitive element to record a holographic interference pattern in the form of fringes comprising a material having a different index of refraction than the material between the fringes,
    (b) processing said holographically exposed photosensitive element to form a volume phase holographic element having microvoids between said fringes, and
    (c) imbibing a liquid crystal which has been heated into said volume phase holographic element to at least partially fill said microvoids with said liquid crystal.

14. A method as defined in claim 13 wherein said volume phase holographic element is a reflection hologram.

15. A method as defined in claim 13 wherein said volume phase holographic element is a transmission hologram.

16. A method as defined in claim 13 wherein said liquid crystal is a nematic liquid crystal.

17. A method as defined in claim 13 wherein said photosensitive element comprises a transparent support carrying a photopolymerizable composition comprising a dye sensitizer, branched polyethylene, a free radical polymerizable ethylenic unsaturated monomer, and lithium acrylate.

18. A method as defined in claim 17 wherein said microvoid-containing volume phase holographic element is treated with zirconyl acetate and then with stearic acid prior to imbibing said liquid crystal into said volume phase holographic element.

19. The method defined in claim 13 wherein said liquid crystal is heated above its clearing temperature.

20. A volume phase holographic element, in which information is recorded as a pattern of fringes of a material having a different index of refraction than the material between the fringes, characterized in that the material between the fringes contains a discontinuous, non-scattering distribution of a separate liquid crystal phase.

* * * * *